United States Patent [19]

Lindner

[11] Patent Number: 5,134,185

[45] Date of Patent: Jul. 28, 1992

[54] LUBRICANT SYSTEM FOR POLYVINYLCHLORIDE, POLYVINYLCHLORIDE ARTICLES, AND A METHOD FOR MANUFACTURING THE SAME

[76] Inventor: Robert A. Lindner, 115 Hemlock, North Wales, Pa. 19454

[21] Appl. No.: 554,790

[22] Filed: Jul. 18, 1990

[51] Int. Cl.$^5$ .................. C08J 3/02; C08L 91/00; C08L 91/06; C09D 4/00
[52] U.S. Cl. ...................... 524/313; 106/270; 106/271
[58] Field of Search ........... 524/313; 106/270, 271

[56] References Cited

U.S. PATENT DOCUMENTS

| | | | |
|---|---|---|---|
| 3,745,033 | 7/1973 | Hutchison | 106/270 |
| 3,929,700 | 12/1975 | Tybus et al. | 524/313 |
| 3,943,079 | 3/1976 | Hamed | 524/14 |
| 3,951,883 | 4/1976 | Ruchlak et al. | 260/2.5 |
| 4,072,657 | 2/1978 | Tanaka et al. | 260/47 |
| 4,072,790 | 2/1978 | Creekmore et al. | 524/569 |
| 4,102,839 | 7/1978 | Crochemore et al. | 260/23 |
| 4,246,150 | 1/1981 | Bower | 106/270 |
| 4,336,176 | 6/1982 | Lindner | 524/310 |
| 4,338,226 | 7/1982 | Worschech et al. | 524/302 |
| 4,392,581 | 7/1983 | Itsubo et al. | 215/348 |
| 4,425,458 | 1/1984 | Lindner et al. | 524/314 |
| 4,487,874 | 12/1984 | Lindner | 524/311 |
| 4,599,370 | 7/1986 | Grossman et al. | 524/313 |
| 4,645,795 | 2/1987 | Hosoi et al. | 525/83 |
| 4,690,977 | 9/1987 | Hosoi et al. | 525/83 |
| 4,797,440 | 1/1989 | Schofield et al. | 524/239 |

Primary Examiner—Paul R. Michl
Assistant Examiner—Patrick Niland

[57] ABSTRACT

A lubricant system providing desirable properties for both internal and external lubricity for polyvinylchloride resins is disclosed. Also disclosed is the use of the lubricants disclosed herein in an extruder. Polyvinylchloride articles obtained using the lubricant mixture of the present invention and/or the extrusion method are also described herein.

15 Claims, No Drawings

LUBRICANT SYSTEM FOR POLYVINYLCHLORIDE, POLYVINYLCHLORIDE ARTICLES, AND A METHOD FOR MANUFACTURING THE SAME

BACKGROUND OF THE INVENTION

1. Field of the Invention

This invention describes a lubricant system for polyvinylchloride resins, articles made from polyvinylchloride and a method of extrusion utilizing the lubricants with polyvinylchloride.

2. Description of the Art Practices

In my earlier U.S. Pat. No. 4,425,458, issued Jan. 10, 1984, I described the use of polyguerbet alcohol esters as lubricants for polycarbonate resin compositions. Similarly, in U.S. Pat. No. 4,487,874, issued Dec. 11, 1984, I disclose polycarbonate lubricants which were formed from the partial esterification of pentaerythritol with an aliphatic carboxylic acid followed by the reaction with an aliphatic dicarboxylic acid.

In my earlier U.S. Pat. No. 4,336,176, issued Jun. 22, 1982, I disclose the manufacture of polyvinylchloride compounds containing an organo-tin compound and a partial ester having functionality as both an internal lubricant and as a co-stabilizer of the resin.

U.S. Pat. No. 4,690,977 to Hosoi et al, issued Sep. 1, 1987, describes vinylchloride polymers comprising a grafted copolymer, the vinylchloride polymer, a rubber copolymer, and a lubrication system which includes a wax lubricant and epoxidized soybean oil. Hosoi et al makes similar disclosures in U.S. Pat. No. 4,645,795, issued Feb. 24, 1987.

U.S. Pat. No. 4,797,440 to Schofield et al, issued Jan. 10, 1989, describes a thermoplastic polymeric organic medium in the presence of a lubricant and a processing additive containing a divalent aliphatic radical. Among the thermoplastic polymers disclosed by Schofield et al, are polyvinylchloride. The possible materials utilized as lubricants by Schofield et al include 12-hydroxy stearic acid, stearic acid, stearamide, a polyethylene was, as well as zinc and calcium stearates.

The stabilization of polyvinylchloride is taught in U.S. Pat. No. 4,338,226, issued Jul. 6, 1982, to Worschech et al. Various calcium and zinc fatty acids and polyol partial esters are disclosed. It is also disclosed by worschech et al that high molecular weight complex esters may be utilized as lubricants and as wall natural fats.

The stabilization of vinylchloride polymers is taught by Crochemore et al in U.S. Pat. No. 4,102,839, issued Jul. 25, 1978. The use of epoxydized soybean oil, a wax, calcium stearate and zinc stearate is disclosed by Crochemore for the processing of vinylchloride.

U.S. Pat. No. 3,951,883, issued Apr. 20, 1976, to Ruchlak, et al, discloses polyvinylchloride molding compositions. Tenaka et al, in U.S. Pat. No. 4,072,657, issued Feb. 7, 1978, discloses synthetic resins which include among others, vinylchloride-vinylacetate copolymers, and described as plasticizers therefore, fatty oils, and waxes.

U.S. Pat. No. 4,392,581, issued Jul. 12, 1983 to Itsubo et al describes vinylchloride resin compositions obtained from a mixed fatty acid ester of glycerin. U.S. Pat. No. 3,578,621 issued May 11, 1971 to Stapfer describes stearamide waxes which may be utilized for plastic processing.

The present invention deals with a simple lubricant additive system for polyvinylchloride resins which is superior to amide wax lubricant systems and which does not present the negatives of epoxidized soy systems. Advantages are also seen in Brabender fusion time, and reduction of frictional heat build up while lowering extrusion die pressure.

Throughout the specification and claims percentages and ratios are by weight, temperatures are in degrees Celsius, and pressures are in KPa gauge unless otherwise indicated. To the extend that any of the references cited herein are applicable, they are hereby specifically incorporated by reference. Ranges and ratios given herein may be combined.

SUMMARY OF THE INVENTION

The present invention deals with a polyvinylchloride lubricant comprising: a homogeneous mixture of (A) a paraffin wax, and (B) a triglyceride ester.

The present invention further describes as a preferred embodiment a polyvinylchloride lubricant comprising a homogeneous mixture of (A) a paraffin wax comprised predominantly of members containing 20 to 30 carbon atoms, and a (B) triglyceride ester wherein the acid groups of the ester contain from about 16 to about 20 carbon atoms and the lubricant is a hardened oil.

The invention further embodies a polyvinylchloride product containing a polyvinylchloride; a paraffin wax; and a triglyceride ester.

The invention also describes a method for working polyvinylchloride resin in an extruder including contacting the polyvinylchloride at substantially the same time with a paraffin wax and a tryglyceride ester.

DETAILED DESCRIPTION OF THE INVENTION

Polyvinylchloride resins are made through the polymerization of vinylchloride monomers. The polyvinylchloride resins are solid materials, usually in particulate form. Polyvinylchloride resins have the distinct advantage of being able to be extruded into various shaped articles having high gloss which are of a rigid nature.

One of the methods of obtaining useful polyvinylchloride articles involves as a first step extruding the polyvinylchloride resin. Typically, a twin screw extruder has the polyvinylchloride pellets fed into the extruder where the pellets are masticated, and thereafter a semi-solid (plastic) polyvinylchloride is extruded and fed to a molding or shaping device.

During the extrusion of polyvinylchloride, both heat and mechanical energy are applied to the extruder. The mechanical energy input to move the polyvinylchloride through the extruder is eventually present as heat energy in the resin. The invention works best when the polyvinylchloride pellets have a maximum dimension of 5 mm to 25 mm, preferably 6 mm to 12 mm.

It is desirable when processing polyvinylchloride that external heat energy be kept to a minimum for cost as well as product stability considerations. That is, it is possible to damage the polyvinylchloride resin by heating the resin to too great a degree during processing. The amount of heat energy applied in the extruding system will be dependent in part upon the characteristics of the lubricants utilized to assist in moving the resin through the extruder. That is, the polyvinylchloride pellets as they are masticated move over one another and friction results. As it is desirable to have sufficient throughput through the extruder, it is necessary that a lubricant system be devised which accounts for the properties of the pellets moving over one another. Moreover, as the pellets change their physical form to a liquid or semi-solid material within the extruder, it is necessary that the lubricant assist in reducing friction on the static surfaces of the extruder as well as the moving screw. Stated otherwise, the lubricant must function such that the moving resin system does not hang up on the walls of the extruder, nor resist removal from the screw at the extruder die.

It is also desirable that a lubricant system for polyvinylchloride resin have the ability to provide external lubricity. By external lubricity, it is meant that if the polyvinylchloride is in a form of a shaped article, that the die or press which is used to obtain the shaped article should not have the resin adhering thereto after the forming of the shaped article.

The present invention using a binary system of lubricants provides superior characteristics with regard to both internal and external lubricity properties. The present invention in its method aspect may be utilized with any conventional extrusion equipment. Suggested sources of such extrusion equipment are found in the references cited herein.

The first lubricant component described herein is a triglyceride ester. It is first desired that the triglyceride ester not be functionalized with any other group. That is, it is desirable to avoid esters such as castor oil which contain hydroxyl groups on the fatty acid portion of the ester. It is also desirable that the triglyceride ester not contain substantial amounts of unsaturation. If the ester contains unsaturation, it may well be too liquid to utilize, and may undergo degradation due to the heat in the extrusion process.

Suitable examples of triglycerides which may be utilized in the present invention are those which contain acid groups (carboxylic) acid wherein each acid group contains from about 15 to 22 carbon atoms. Preferably, the triglyceride contains from about 16 to about 20 carbon atoms. Suitable triglyceride esters for use herein include cottonseed, soya, sunflower, peanut, rape, safflower, sesame, poppy, niger, linseed, corn, coconut, palm, and olive and mixtures thereof.

As previously suggested, it is desired that any unsaturation within the triglyceride ester be saturated before its use in the present invention. Conventional hydrogenation techniques may be utilized to harden the triglyceride ester. The triglyceride ester desirable has an acid value of 0-4; a hydroxyl value of 0-4; and a spaonification number of about 180-210.

The second component of the unique lubricating system for polyvinylchloride resins described herein is a paraffin wax. Paraffin waxes typically contain from about 20 to about 30 carbon atoms. The paraffin waxes are typically linear and contain little or no unsaturation. It is preferred that the paraffin waxes of the present invention be fully saturated for the reasons discussed above with regard to unsaturation in the oil. Paraffin wax desirably has a melt point of from about 140° to 170° F. (60°-77° C.). Preferably, the paraffin has a melt point of about 150° F. to 160° F. (65°-71° C.).

A conventional method of utilizing the composition of the present invention is to mix the paraffin wax and the triglyceride ester together. A homogeneous system may be obtained by mixing the triglyceride ester and the paraffin wax at a weight ratio of respectively about 50:1 to about 1:50; preferably about 25:1 to about 1:25 and most preferably 3:1 to about 1:5.

The unique mixture of the paraffin wax and the triglyceride ester may then be added to the polyvinylchloride resin system either prior to extrusion or by adding the mixture of the lubricant to the extruder. It is of course also possible to separately add each of the two lubricant components to the polyvinylchloride resin either in the extruder or the resin. It is also possible to add either the paraffin wax or the triglyceride ester to the polyvinylchloride resin and the other lubricant to the extruder. Stated otherwise, the present invention has a great deal of versatility.

It is of course noted that the lubricants may be added wither as a solid or a liquid to the processing system. That is, the lubricants, if in a solid state will be processed to a liquid state by the thermal and mechanical energy present within the extruder.

ADDITIONAL COMPONENTS

Typically, many additional components are utilized in polyvinylchloride processing. Generally, any of the normally used components in polyvinylchloride processing which do not materially interfere with the functioning of the lubricant in the present invention may be utilized herein.

Such suitable additional components include materials such as calcium carbonate as a filler, a pigment such as titanium dioxide, an impact modifier such as Acryloid KM334 available from Rohm and Haas. Polyvinylchloride resins also contain stabilizers to prevent degradation of the resin in use. That is, hydrochloric acid is generated on degradation of the polyvinylchloride resin which then further initiates degradation of the resin and surrounding components. Many different stabilizers are utilized including various cadmium, lead, or tin compounds. In the present invention, it is preferred to use tin stabilizers and a suggested source thereof is Advastab TM181. Further processing aids which may be utilized in the present invention include costabilizers and additional lubricants such as straight chain fatty acid salts including materials such as calcium or magnesium stearate.

Any of the foregoing components are typically utilized within the present invention at the levels normally found in polyvinylchloride processing systems.

AMOUNT OF THE COMPONENTS

Typically, when practicing the present invention the polyvinylchloride resin will be utilized at 100 parts with the triglyceride ester utilized at from about 0.1 to about 5 parts per hundred parts of the polyvinylchloride. A more preferable range for the weight ratio of the triglyceride ester to the polyvinylchloride is from about 0.2 part to about 4 parts; more preferably about 0.3 part to about 3 parts.

The paraffin utilized in the present invention per hundred parts of the polyvinylchloride is typically at about 0.3 part to 10 parts; preferably at about 0.4 part to about 8 parts. Of course, the weight ratio of the paraffin to the triglyceride ester is within any of the aforementioned ranges. Greater or lesser amounts of either of the lubricating components may be utilized when encountering difficulty in meeting the objectives of the invention due to exigent processing considerations.

What follows is an example of the present invention.

EXAMPLE I

A polyvinylchloride composition is obtained by combining the following components.

| Component | Amount |
|---|---|
| Polyvinylchloride resin K62-65 | 100.0 |
| Calcium carbonate filler Superflex 100 | 5.0 |
| Titanium dioxide Titanox 2101 | 10.0 |
| Acryloid KM 334 | 5.0 |
| Tin stabilizer Advastab TM181 | 1.2 |
| Calcium stearate | 1.0 |

The foregoing mixture then has added thereto either the amide was (comparative example) or a mixture of Lubol 352 triglyceride available from Cylon Industries at 0.375 parts in mixture with paraffin 165 at 0.625 parts.

The following tables show the advantage of using the lubricant system of the present invention as opposed to the amide wax.

TABLE I

|  | (A) | (AB) |
|---|---|---|
| Amine Wax | 1.5 |  |
| Lubol 352 |  | .375 |
| Paraffin 165 |  | .625 |
| Brabender Fusion I | 3.4 min | 3.5 min |
| (175° C. 60 g 60 rpm)II | 3.4 min | 3.4 min |
| Max torque | 2900 | 3000 |
| Equilibrium Torque | 2100 | 2050 |
| 5 min Brabender Stab | 0 | 0 |
| 10 min (190° 60 g 60 rpm) | 0 | 1 |
| 15 min color rating | 2 | 5 |
| 20 min 0-10 black | 4 | 7 |
| 25 min | 8 | 8 |

TABLE II

|  | B | Z | S |
|---|---|---|---|
| Amide Wax | 2.0 |  |  |
| Lubol 352 |  | .625 | .5 |
| Paraffin 145 |  | .875 | 1.0 |
| Brabender Fusion | 4.4 min | 4.0 | 4.9 |
| (175° C. 60 g 60 rpm) | 4.7 min | 4.2 | 4.8 |
| Max Torque | 2750 |  | 2800 |
| Equilibrium Torque | 2050 |  | 2150 |
| 5 min Brabender Stab | 0 |  | 0 |
| 10 min 190° C. 60 g 60 rpm | 0 |  | 1 |
| 15 min Color Rating | 1 |  | 6 |
| 20 min 0 White - 10 Black | 2 |  | 7 |
| 25 min 0 White - 10 Black | 6 |  | 8 |

TABLE III

|  | C | L |
|---|---|---|
| Amide Wax | 2.5 |  |
| Lubol 352 |  | 1.5 |
| Paraffin 145 |  | .5 |
| Brabender Fusion | 5.6 | 6.0 |
| (175° C. 60 g 60 rpm) | 5.9 | 5.3 |
| Max Torque | 2650 | 2750 |

TABLE III-continued

|  | C | L |
|---|---|---|
| Equilibrium Torque | 2000 | 2150 |
| 5 min Brabender Stab | 0 | 0 |
| 10 min 190° C. 60 g 60 rpm | 0 | 1 |
| 15 min Color Rating | 1 | 3 |
| 20 min 0 White - 10 Black | 2 | 6 |
| 25 min 0 White - 10 Black | 7 | 7 |

The applicant for patent, hereby having made a full a complete disclosure of that which is necessary to enable one skilled in the art to practice the present invention desires that the foregoing be utilized to exemplify but not to limit the scope of the present invention.

What is claimed is:

1. A rigid high gloss polyvinylchloride article prepared from a mixture of (A) a paraffin wax, (B) a triglyceride ester and polyvinylchloride.

2. The polyvinylchloride article of claim 1 wherein the weight ratio (A) to (B) is about 50:1 to about 1:50.

3. The polyvinylchloride article of claim 1 additionally comprising calcium stearate.

4. The polyvinylchloride article of claim 1 wherein the paraffin has a melt point of from 140° to 170°0 F.

5. The polyvinylchloride article of claim 1 wherein each of the acid groups in the triglyceride contains about 15 to about 22 carbon atoms.

6. The polyvinylchloride article of claim 1 additionally containing a tin stabilizer.

7. The polyvinylchloride article of claim 1 wherein the triglyceride ester is hardened tallow or cottonseed oil.

8. The polyvinylchloride article of claim 1 which is substantially free of castor oil.

9. The polyvinylchloride article of claim 1 wherein the article is siding.

10. The polyvinylchloride article of claim 1 wherein the paraffin is comprised predominantly of hydrocarbons containing 20 to 30 carbon atoms.

11. The polyvinylchloride article of claim 1 additionally comprising a calcium carbonate filler.

12. The polyvinylchloride article of claim 1 where the weight ratio of (A) to (B) is about 25:1 to 1:25.

13. A rigid polyvinylchloride article prepared from a homogeneous mixture of (A) a paraffin wax comprised predominantly of members containing 20 to 30 carbon atoms, (B) a triglyceride ester wherein the acid groups of the ester contain from about 16 to about 20 carbon atoms of polyvinylchloride wherein (B) is a hardened oil.

14. A polyvinylchloride product containing polyvinylchloride; a paraffin wax; and a triglyceride ester.

15. The polyvinylchloride product of claim 14 wherein the product is siding.

* * * * *

UNITED STATES PATENT AND TRADEMARK OFFICE
CERTIFICATE OF CORRECTION

PATENT NO. : 5,134,185

DATED : July 28, 1992

INVENTOR(S) : Robert A. Lindner

It is certified that error appears in the above-identified patent and that said Letters Patent is hereby corrected as shown below:

Column 1, line 42, "was", should read "wax".
Column 1, line 48, "worschech", should read "Worschech".
Column 1, line 49, "wall", should read "well".
Column 2, line 11, "extend", should read "extent".

Column 3, line 49, "spaonication", should read "saponification".
Column 3, line 62, "conventional", should read "convenient".
Column 4, line 13, "wither", should read "either",
Column 5, line 12, "was", should read "wax".

Column 6, line 24, "170°0", should read "170°".
Column 6, line 49, "of", should read "and".

Signed and Sealed this

Second Day of August, 1994

Attest:

BRUCE LEHMAN

*Attesting Officer*    *Commissioner of Patents and Trademarks*